J. IVES.
Cattle Tie.

No. 49,630.

Patented Aug. 29, 1865.

UNITED STATES PATENT OFFICE.

JAMES IVES, OF MOUNT CARMEL, CONNECTICUT.

IMPROVED CATTLE-TIE.

Specification forming part of Letters Patent No. 49,630, dated August 29, 1865.

*To all whom it may concern:*

Be it known that I, JAMES IVES, of Mount Carmel, New Haven county, State of Connecticut, have invented a new and Improved Cattle-Tie; and I do hereby declare that the following is a full, clear, and exact description thereof, reference being had to the accompanying drawings, making part of this specification, in which—

Figure 1:
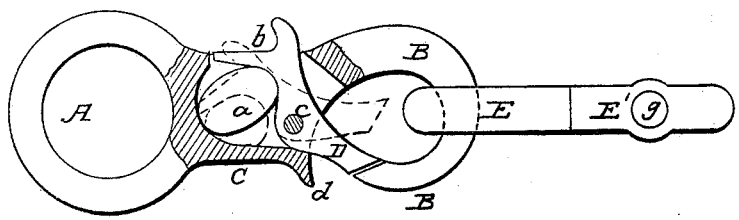
Figure 2:
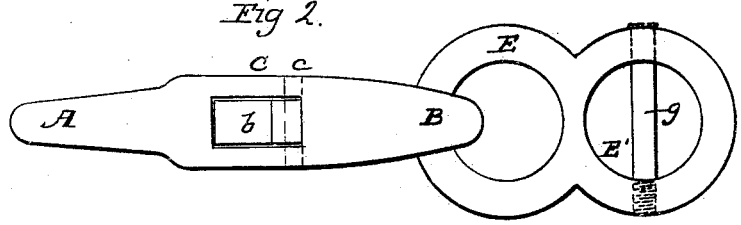
Figure 3:
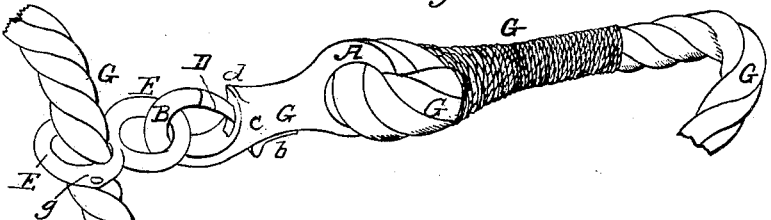
Figure 4:
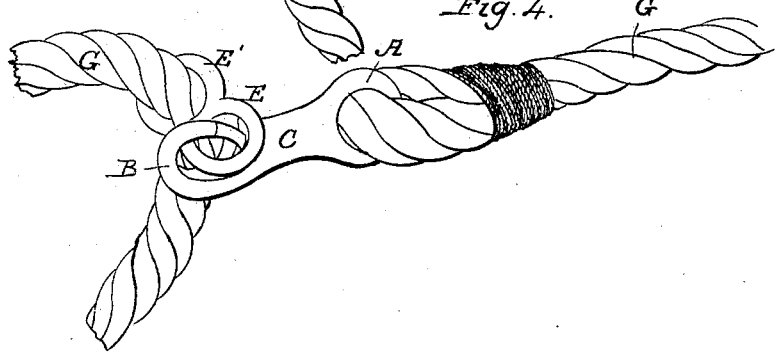

Figure 1 is an enlarged sectional view of the snap or halter-fastening. Fig. 2 is an edge view thereof attached to the double-eye link. Figs. 3 and 4 are perspective views of my halter-snap.

Similar letters of reference indicate corresponding parts in the several figures.

The main object of this invention and improvement on the fastenings of rope-halters for cattle is to prevent the closing-tongue of the fastening-hook from being casually displaced under any circumstances; also, to so construct and apply the rope link to the rope halter that this link cannot be made to slip, and thus tighten the halter about the neck of the animal, or assume any other position on the rope than that in which it was applied, as will be hereinafter described.

To enable others skilled in the art to make and use my invention, I will describe its construction and operation.

In the accompanying drawings, A represents a ring which is formed on one end of the shank of a snap-hook, B, for receiving and admitting of the attachment of a rope to the snap-hook. C is the contracted shank of the snap-hook, which is recessed in such manner as to receive within it an elliptical spring, a, and also the closing-tongue D of the hook. This tongue is constructed so as to form a continuation of the hook B, as shown in black lines, Figs. 1, 3, and 4, and also a curved rear extension, b, back of the pivot or fulcrum pin c, which receives and retains in place the rubber spring a, as shown in Fig. 1, and also serves as a finger-piece for compressing the spring a and enabling a person to move the tongue back, as indicated in red lines, Fig. 1, for releasing the ring or link E.

It will be seen that I locate the spring which acts upon the tongue to keep its beveled end closed against the corresponding end of the hook in rear of the pivot-pin c, and am thus enabled to locate said pin very near the end of the hook, and consequently to make the exposed portion of the closing-tongue D very short. By shortening the tongue I leave barely room enough to enter the ring or other object to which the snap is to be attached, and make the surrounding parts of the hook and its shank form a guard for preventing a casual displacement of this tongue.

I do not confine my invention to the use of a rubber spring in rear of the fulcrum of the closing-tongue, as metal springs will be found to answer a very good purpose.

On that side of the shank C nearest the beveled point of the hook B is a projection, d, which forms a kind of guard to prevent anything from coming in contact with the tongue which would press it inward and release its hook from the ring E. This projection also serves to prevent any lateral strain of the ring E upon said tongue—as, for instance, when the parts are in the position represented in Fig. 4.

The ring or link E is formed on the ring E' in such manner that both rings are in the same plane and the latter ring is attached at a suitable point to the halter-rope G by passing the latter through it and then inserting a rivet or screw-pin, g, diametrically through the ring and rope. By thus attaching the rings to the rope they are prevented from slipping thereon in consequence of the pin g spreading the rope and causing it to hold the ring tighter when under tension than when it is slack.

By having the two rings connected together as described, and shown in the drawings, they draw upon the rope in a diagonal direction, and hence operate as a clamp on the rope, and, furthermore, they cannot be arranged in any position, when the halter is fastened around the neck of an animal, which will admit of the ring E drawing the tongue inward.

Having thus described my invention, what I claim as new, and desire to secure by Letters Patent, is—

1. Providing for shortening the snap or closing-tongue of a snap-hook by applying the spring which operates to keep the tongue in place against the end of the hook in rear of the pivot-connection of said tongue, substantially as described.

2. Adapting the rear extension of the lever-tongue D to receive and retain in place a spring which is located in rear of the fulcrum of said tongue, substantially as described.

3. Constructing the fastening-rings E E' and applying them to the halter-rope substantially as described.

JAMES IVES.

Witnesses:
MARY A. IVES,
L. A. IVES.